United States Patent
Rashid et al.

(10) Patent No.: US 10,443,358 B2
(45) Date of Patent: Oct. 15, 2019

(54) OILFIELD-WIDE PRODUCTION OPTIMIZATION

(71) Applicant: Schlumberger Technology Corporation, Sugar Land, TX (US)

(72) Inventors: Kashif Rashid, Wayland, MA (US); David John Rossi, Abingdon (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 331 days.

(21) Appl. No.: 15/014,869

(22) Filed: Feb. 3, 2016

(65) Prior Publication Data

US 2016/0153266 A1 Jun. 2, 2016

Related U.S. Application Data

(63) Continuation-in-part of application No. 14/466,750, filed on Aug. 22, 2014, now Pat. No. 9,951,601.

(51) Int. Cl.
*E21B 43/12* (2006.01)
*E21B 41/00* (2006.01)
(Continued)

(52) U.S. Cl.
CPC ........ *E21B 41/0092* (2013.01); *E21B 43/121* (2013.01); *E21B 43/122* (2013.01);
(Continued)

(58) Field of Classification Search
CPC .... E21B 43/122; E21B 41/0092; E21B 43/12; E21B 43/121; G05D 7/0635; F04B 47/02
See application file for complete search history.

(56) References Cited

U.S. PATENT DOCUMENTS 4,633,954 A 1/1987 Dixon et al.
5,176,164 A 1/1993 Boyle
(Continued)

FOREIGN PATENT DOCUMENTS

GB 2336008 A 10/1999
GB 2457395 B 8/2011
(Continued)

OTHER PUBLICATIONS

Exam and Search Report issued in related GB application GB1513923.1 dated Mar. 8, 2016, 5 pages.
(Continued)

*Primary Examiner* — Tuan C Dao
(74) *Attorney, Agent, or Firm* — Colin L. Wier

(57) ABSTRACT

A method, apparatus, and computer readable storage medium perform oilfield-wide optimization in a field with a plurality of wells, with each well including a well flow rate management mechanism controlled by an associated well controller. In a central controller, a network simulation model functioning as a proxy of the field is accessed to determine an optimal allocation solution for the field, and a well-specific control signal is generated for each of the plurality of wells based upon the determined optimal allocation solution. The well-specific control signal for each of the plurality of wells is communicated to cause the associated well controller to control a flow rate management parameter associated with the well flow rate management mechanism for the well.

22 Claims, 8 Drawing Sheets

(51) Int. Cl.
   *E21B 47/00* (2012.01)
   *G05D 7/06* (2006.01)
   *F04B 49/06* (2006.01)
   *F04B 47/02* (2006.01)

(52) U.S. Cl.
   CPC .............. *E21B 47/00* (2013.01); *F04B 47/02* (2013.01); *F04B 49/065* (2013.01); *G05D 7/0635* (2013.01)

(56) References Cited

U.S. PATENT DOCUMENTS

| | | | |
|---|---|---|---|
| 5,634,522 | A | 6/1997 | Hershberger |
| 5,782,261 | A | 7/1998 | Becker et al. |
| 5,871,048 | A | 2/1999 | Tokar et al. |
| 5,992,519 | A | 11/1999 | Ramakrishnan et al. |
| 6,018,497 | A | 1/2000 | Gunasekera |
| 6,078,869 | A | 6/2000 | Gunasekera |
| 6,106,561 | A | 8/2000 | Farmer |
| 6,178,815 | B1 | 1/2001 | Felling et al. |
| 6,206,645 | B1 | 3/2001 | Pringle |
| 6,229,308 | B1 | 5/2001 | Freedman |
| 6,230,101 | B1 | 5/2001 | Wallis |
| 6,236,894 | B1 | 5/2001 | Stoisits et al. |
| 6,313,837 | B1 | 11/2001 | Assa et al. |
| 6,507,774 | B1 | 1/2003 | Reifman et al. |
| 6,775,578 | B2 | 8/2004 | Couet et al. |
| 6,840,317 | B2 | 1/2005 | Hirsch et al. |
| 6,980,940 | B1 | 12/2005 | Gurpinar et al. |
| 7,114,557 | B2 | 10/2006 | Cudmore et al. |
| 7,164,990 | B2 | 1/2007 | Bratvedt et al. |
| 7,172,020 | B2 | 2/2007 | Tseytlin |
| 7,248,259 | B2 | 7/2007 | Fremming |
| 7,561,928 | B2 | 7/2009 | Peureux et al. |
| 7,627,461 | B2 | 12/2009 | Guyaguler et al. |
| 7,720,575 | B2 | 5/2010 | Ferber et al. |
| 7,752,023 | B2 | 7/2010 | Middya |
| 7,904,280 | B2 | 3/2011 | Wood |
| 7,953,584 | B2 | 5/2011 | Rashid |
| 8,078,444 | B2 | 12/2011 | Rashid et al. |
| 8,401,832 | B2 | 3/2013 | Ghorayeb et al. |
| 8,670,966 | B2 | 3/2014 | Rashid et al. |
| 8,752,621 | B2 | 6/2014 | Curlson et al. |
| 2002/0015401 | A1 | 2/2002 | Subramanian et al. |
| 2002/0029883 | A1* | 3/2002 | Vinegar ................ E21B 17/003 166/250.15 |
| 2002/0165671 | A1 | 11/2002 | Middya |
| 2003/0094281 | A1 | 5/2003 | Tubel |
| 2003/0132934 | A1 | 7/2003 | Fremming |
| 2003/0216897 | A1 | 11/2003 | Endres et al. |
| 2004/0104027 | A1 | 6/2004 | Rossi et al. |
| 2004/0220846 | A1 | 11/2004 | Cullick et al. |
| 2005/0149264 | A1 | 7/2005 | Tarvin et al. |
| 2005/0149307 | A1 | 7/2005 | Gurpinar et al. |
| 2006/0076140 | A1 | 4/2006 | Rouen |
| 2006/0085174 | A1 | 4/2006 | Hemanthkumar et al. |
| 2006/0090893 | A1 | 5/2006 | Sheffield |
| 2006/0129366 | A1 | 6/2006 | Shaw |
| 2006/0184329 | A1 | 8/2006 | Rowan et al. |
| 2006/0197759 | A1 | 9/2006 | Fremming |
| 2007/0027666 | A1* | 2/2007 | Frankel .................. E21B 43/00 703/10 |
| 2007/0112547 | A1 | 5/2007 | Ghorayeb et al. |
| 2007/0175640 | A1 | 8/2007 | Atencio et al. |
| 2007/0198223 | A1 | 8/2007 | Ella et al. |
| 2007/0239402 | A1 | 10/2007 | Scott |
| 2007/0246222 | A1 | 10/2007 | Ramachandran |
| 2008/0010245 | A1 | 1/2008 | Kim et al. |
| 2008/0029272 | A1 | 2/2008 | Bender |
| 2008/0140369 | A1 | 6/2008 | Rashid et al. |
| 2008/0154393 | A1 | 6/2008 | Reshef |
| 2008/0154564 | A1* | 6/2008 | Rashid .................. E21B 43/122 703/10 |
| 2008/0234939 | A1 | 9/2008 | Foot et al. |
| 2008/0262737 | A1 | 10/2008 | Thigpen et al. |
| 2009/0125207 | A1 | 5/2009 | Nomura et al. |
| 2009/0166033 | A1 | 7/2009 | Brouwer et al. |
| 2009/0194274 | A1 | 8/2009 | Castillo et al. |
| 2009/0198478 | A1* | 8/2009 | Cuevas ................ E21B 43/122 703/10 |
| 2009/0260823 | A1 | 10/2009 | Prince-Wright et al. |
| 2009/0300134 | A1 | 12/2009 | Smith et al. |
| 2010/0042458 | A1 | 2/2010 | Rashid et al. |
| 2010/0063639 | A1 | 3/2010 | Gothard |
| 2010/0131202 | A1 | 5/2010 | Dannevik et al. |
| 2011/0257766 | A1 | 10/2011 | Sundaram et al. |
| 2011/0270591 | A1 | 11/2011 | Couet et al. |
| 2012/0215364 | A1* | 8/2012 | Rossi .................... E21B 43/121 700/281 |
| 2013/0036077 | A1 | 2/2013 | Moran et al. |
| 2015/0300158 | A1* | 10/2015 | San Martin ............ G01B 7/003 702/6 |
| 2016/0053753 | A1 | 2/2016 | Rashid et al. |

FOREIGN PATENT DOCUMENTS

| | | |
|---|---|---|
| RU | 1794179 A3 | 2/1993 |
| RU | 2081301 C1 | 10/1997 |
| WO | 1999/64896 A1 | 12/1999 |
| WO | 2004/049216 A1 | 6/2004 |
| WO | 2005/122001 A1 | 12/2005 |
| WO | 2008/070864 A1 | 6/2008 |
| WO | 2013/188090 A1 | 12/2013 |

OTHER PUBLICATIONS

Al-Khaldi, et al., "Production Enhancement Khafiji Field using Advanced Optimization Techniques," SPE 120664, SPE Middle East Oil and Gas Show and Conference, Bahrain, Bahrain, Mar. 15-18, 2009.

Buitrago, et al., "Global Optimization Techniques in Gas Allocation for Continuous Flow Gas Lift Systems," SPE Gas Technology Conference held in Calgary, Alberta, Canada Apr. 28-May 1, 1996, pp. 375-383.

Diez et al., "Opportunities and challenges of using sequential quadratic programming (SQP) for optimization of petroleum production networks," European Symposium on Computer Aided Process Engineering, 2005, pp. 169-174.

Economides, et al., "Chapter 19: Gas Lift," Petroleum Production Systems, PTR Prentice hall: Englewood Cliffs, NJ, 1994, pp. 523-550.

Edwards, et al., "A Gas-Lift Optimization and Allocation Model for Manifolded Subsea Wells," SPE 20979, European Petroleum Conference, The Hague, Netherlands, Oct. 22-24, 1990, pp. 535-545.

Handley-Schachler, et al., "New Mathematical Techniques for The Optimisation of Oil & Gas Production Systems," SPE 65161, SPE European Petroleum Conference, Paris, France, Oct. 24-25, 2000.

Hepguler, et al., "Integration of a Filed Surface and Production network with a Reservoir Simulator," SPE 38937, SPE Computer Applications, Jun. 1997 pp. 88-93.

Jha, et al., "Implementation of Integrated Network Optimization Model for the Mumbai High Field-Crucial to Field-Wide Optimization," SPE 123799, Offshore Europe Oil & Gas Conference & Exhibition, Aberdeen UK, Sep. 8-11, 2009.

Kanu, et al., "Economic Approach to Oil Production and Gas Allocation in Continuous Gas Lift," Journal of Petroleum Technology, Society of Petroleum Engineers of AIME, Oct. 1981, pp. 1887-1892.

Petroleum Experts, "IPM-GAP, Prosper, MBAL, PVTP, Reveeal, Resolve, Poenserver," 2008.

Rashid, et al., "Review Article—A Survey of Methods for Gas-Lift Optimization," 2012.

Reeves, et al., "Gas Lift Automation: Real Time Data to Desktop for Optimizing an Offshore GOM Platform," 2SPE 84166, SPE Annual Technical Conference and Exhibition, Denver, Colorado, USA Oct. 5-8, 2003.

Schlumberger, "Avocet Gas Lift Optimization Module," Schlumberger Brochure No. 08-IS-298, 2008.

(56) References Cited

OTHER PUBLICATIONS

Schlumberger, "Avocet, Integrated Asset Modeler," Schlumberger Brochure No. 05-IS-246, 2005.
Schlumberger, "PIPESIM, Pipeline and facilities design and analysis," Schlumberger Information Solutions Brochure No. SIS_02_0231_0, Jan. 2003.
Schlumberger, "PIPESIM, Well design and production performance analysis," Schlumberger Information Solutions Brochure No. SIS_02_0232_0, Jan. 2003.
Wong, et al., "Real Time Production Surveillance and Optimization Solution Implementation in an Offshre Brownfield in Malaysia," SPE 133515, SPE Asia Pacific Oil and Gas Conference and Exhibition, Brisbane, Queensland, Australia, Oct. 18-20, 2010.
Office Action for the cross referenced Russian patent application 2009125924 dated Dec. 1, 2011.
International Search Report for the equivalent International patent application PCT/US2012/025785 dated Sep. 24, 2012.
Office Action for the cross referenced Mexican patent application MX/a/2009/005902 dated Mar. 6, 2013.
Office Action for the cross referenced Canadian patent application 2671367 dated May 9, 2014.
Examination Report for the equivalent UK patent application 1513923.1 dated Oct. 13, 2016.
Final Office Action for the equivalent U.S. Appl. No. 14/466,750 dated Aug. 18, 2017.
Gutierrez, et al., "A New Approach to Gas Lift Optimization Using an Integrated Asset Model", IPTC-1159—International Petroleum Technology Conference, Dec. 4-6, Dubai, U.A.E., Dec. 4-6, 2007, 10 pages.
Moitra, et al., "A Fieldwide Integrated Production Model and Asset Management System for the Mumbai High Field", OTC-18678-MS, Offshore Technology Conference, Houston, Texas, U.S.A., Apr. 30-May 2007, 12 pages.
Rashid, et al., "Gas-Lift Optimization with Choke Control using a Mixed-Integer Nonlinear Formulation", Industrial and Engineering Chemistry, vol. 50, Issue 5, Jan. 27, 2011, pp. 2971-2980.
Rashid, "Optimal Allocation Procedure for Gas-Lift Optimization", Industrial and Engineering Chemistry Research, vol. 49, No. 5, Jan. 26, 2010, pp. 2286-2294.

* cited by examiner

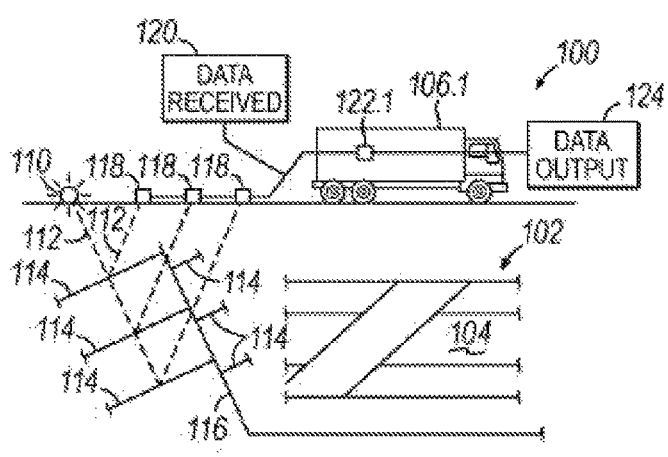
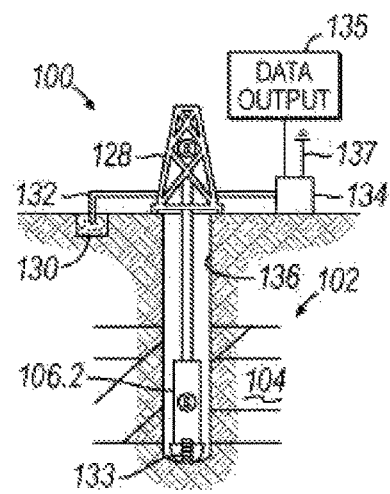
FIG. 1A  FIG. 1B
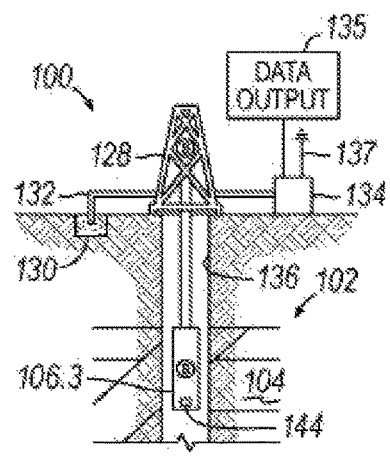
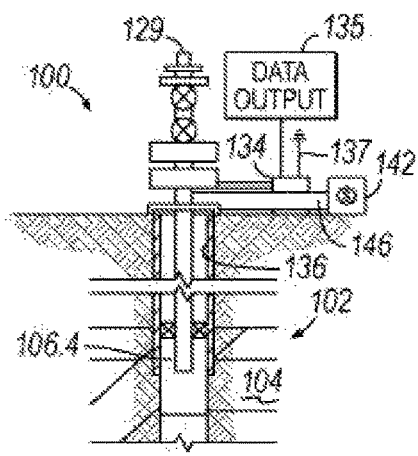
FIG. 1C  FIG. 1D

OILFIELD-WIDE PRODUCTION OPTIMIZATION

CROSS-REFERENCE TO RELATED APPLICATIONS

This application is a continuation-in-part of U.S. patent application Ser. No. 14/466,750 filed on Aug. 22, 2014, which is incorporated by reference herein in its entirety.

BACKGROUND

In certain oil reservoirs, the pressure inside the reservoir is insufficient to push wellbore fluids to the surface without the help of a pump or other so-called artificial lift technology such as gas lift in the well. With a gas-based artificial lift system, external gas is injected into special gas lift valves placed inside a well at specific design depths. The injected gas mixes with produced fluids from the reservoir, and the injected gas decreases the pressure gradient inside the well, from the point of gas injection up to the surface. Bottom hole fluid pressure is thereby reduced, which increases the pressure drawdown (pressure difference between the reservoir and the bottom of the well) to increase the well fluid flow rate.

Other artificial lift technologies may also be used, e.g., electro-submersible pumps (ESPs), progressing cavity pumps (PCPs), sucker rod pumps (SRPs), hydraulic jet pumps, hydraulic piston pumps. Furthermore, with some oil reservoirs, a mixture of artificial lift technologies may be used on different wells. In addition, other production optimization technologies may be used in some reservoirs, e.g., chemical stimulation using diluents, inhibitors, surfactants, etc. to increase the flow of wellbore fluids within such reservoirs. Given also that multiple wells coupled to the same reservoir may impact the production of one another, additional technologies, such as chokes and other flow restriction devices, may also be used in some wells to control well fluid flow rate. Further, combinations of these technologies may also be used in some wells. As such, a number of different technologies, referred to herein as well flow rate management technologies, may be used to control the well fluid flow rate of a well.

Specifically with respect to gas lift and artificial lift systems, during the initial design of a gas lift or other artificial lift system to be installed in a borehole, software models have traditionally been used to determine the best configuration of artificial lift mechanisms, e.g., the gas lift valves, in a well, based on knowledge about the reservoir, well and reservoir fluids. However, models that are limited to single wells generally do not take into account the effects of other wells in the same field, and it has been found that the coupling through the surface network of wells in the same field will affect the actual rates experienced by each well.

Software models have also been developed to attempt to optimally configure artificial lift mechanisms for multiple wells coupled to each other in the same oilfield or surface production network. Such models, which may be referred to as surface network models, better account for the interrelationships between wells and the artificial lift mechanisms employed by the various wells. Nonetheless, shortcomings still exist with such multi-well models. For example, a surface network model is an approximation to reality, so the computed optimized lift gas rates for a gas-based artificial lift system are an approximation to the true optimum rates. In addition, a surface network model generally has to be continually re-calibrated so that it remains an accurate representation of the real network. Online measurements of a surface production network (e.g., actual measurements of pressures, temperatures and flow rates) generally are cross-checked against model calculations to insure that the two are consistent. If they differ substantially, a human operator may intervene to alter the surface network model to improve the match. In addition, in some instances a surface network model may have to be re-run whenever surface network conditions change, that is, whenever the well head flowing back pressures change, so that optimized lift gas rate values change. Surface network conditions can change frequently, for example, in response to instantaneous changes in the surface facility settings, equipment status and availability (equipment turning on and off), changes in ambient temperature, and at slower time scales, changes in fluid composition such as gas-oil ratio and water cut and surface network solid buildup or bottle-necking.

Therefore, a need continues to exist in the art for an improved manner of optimizing artificial lift technologies and other well flow rate management technologies for multiple wells in a multi-well production network.

SUMMARY

The embodiments disclosed herein provide a method, apparatus, and computer readable storage medium that perform oilfield-wide production optimization in a field comprising multiple wells, with each well including a well flow rate management mechanism controlled by an associated well controller. In a central controller, a network simulation model functioning as a proxy of the field is accessed to determine an optimal allocation solution for the field, and a well-specific control signal is generated for each well based upon the determined optimal allocation solution. The well-specific control signal for each well is communicated to cause the associated well controller to control a flow rate management parameter associated with the well flow rate management mechanism for the well.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described example embodiments of the invention. This summary is merely provided to introduce a selection of concepts that are further described below in the detailed description, and is not intended to identify key or essential features of the claimed subject matter, nor is it intended to be used as an aid in limiting the scope of the claimed subject matter.

BRIEF DESCRIPTION OF THE DRAWINGS

FIGS. 1A-1D illustrate simplified, schematic views of an oilfield having subterranean formations containing reservoirs therein in accordance with implementations of various technologies and techniques described herein.

DETAILED DESCRIPTION

Figure 2:
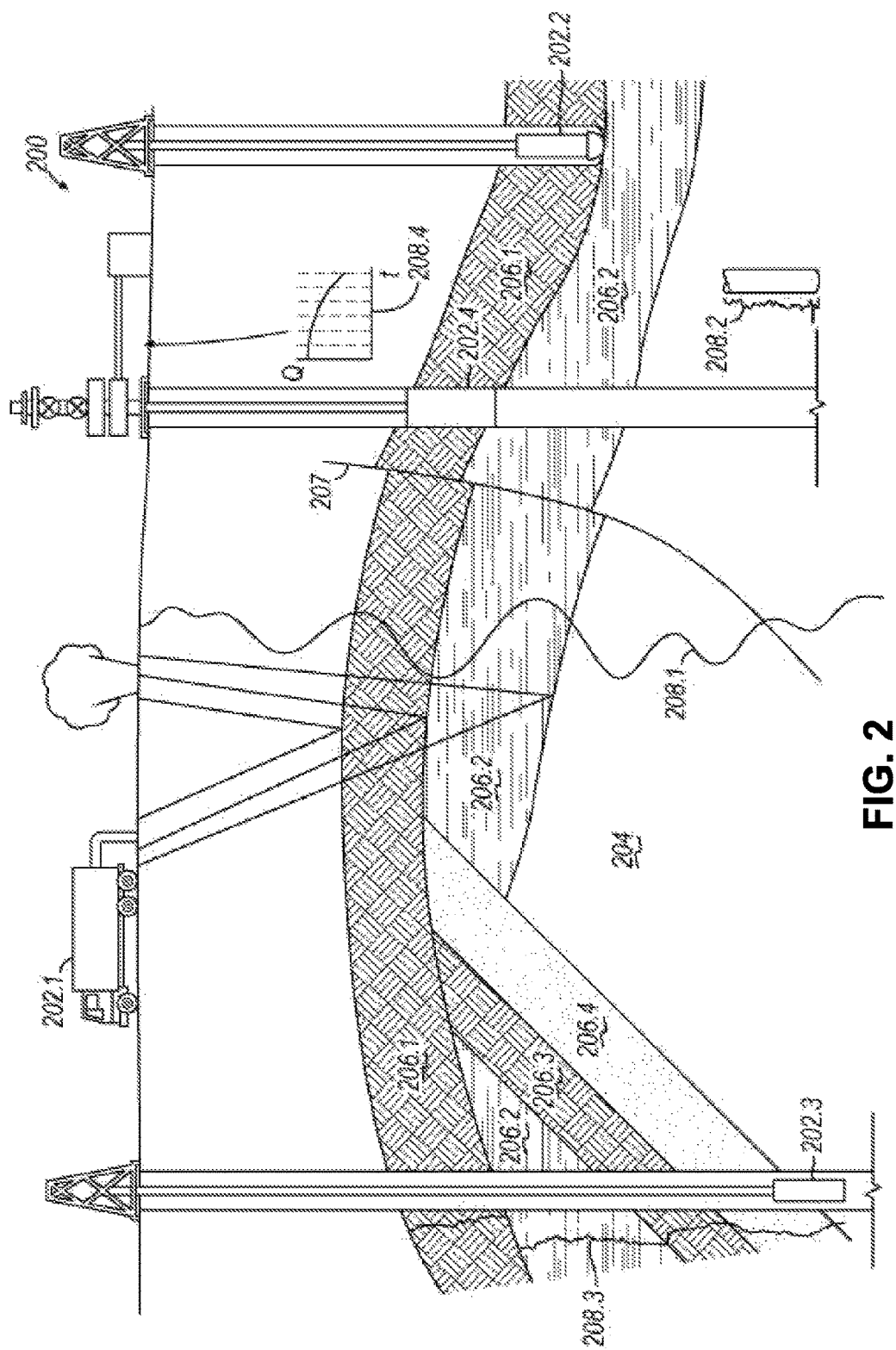
FIG. 2 illustrates a schematic view, partially in cross section of an oilfield having a plurality of data acquisition tools positioned at various locations along the oilfield for collecting data from the subterranean formations in accordance with implementations of various technologies and techniques described herein.

The discussion below is directed to certain specific implementations. It is to be understood that the discussion below is only for the purpose of enabling a person with ordinary skill in the art to make and use any subject matter defined now or later by the patent "claims" found in any issued patent herein.

Embodiments consistent with the invention may be used to perform oilfield-wide production optimization for a plurality of wells in an oilfield (field), where each well, or at least each of a subset of the plurality of wells, includes one or more well flow rate management mechanisms, e.g., various types of artificial lift mechanisms using gas lift mechanisms (e.g., using natural gas, field gas, carbon dioxide, etc.), pumps such as electro-submersible pumps (ESPs), progressing cavity pumps (PCPs), sucker rod pumps (SRPs), hydraulic jet pumps, hydraulic piston pumps, etc., various types of chemical stimulation techniques using diluents, inhibitors, surfactants, etc., various types of flow restriction devices (e.g., chokes or valves), or other technologies and/or mechanisms that may be used to control the well fluid flow rate for a well. Some of the embodiments discussed hereinafter refer to gas lift optimization, but it will be appreciated that the invention is not so limited, so any references hereinafter to gas lift optimization should not be interpreted as limiting the invention to use solely with gas-based artificial lift mechanisms.

It will be appreciated that in various embodiments of the invention, a distributed control system incorporating a central controller coupled to individual well controllers may be used. The central controller may utilize a network simulation model as a proxy for the oilfield to generate an optimal allocation solution for the oilfield as a whole, and then distribute well-specific control signals that cause each of a plurality of wells in the oilfield to control a flow rate management parameter associated with a well flow rate management mechanism for that well and thereby implement the field-wide solution. Such causation may occur, for example, as a result of the central controller distributing individual control signals to each well controller to induce the well controller to effect the desired control of its associated well flow rate management mechanism. In some embodiments, however, one or more well controllers may not be automated for direct control by the central controller, whereby rather than communicating a well-specific control signal to an associated well controller to cause that associated well controller to automatically control a flow rate management parameter, the well-specific control signal may be provided as a set point or other instruction to a well operator to enable that well operator to effect the causation by manually configuring the well controller. In addition, in some embodiments feedback, e.g., actual well head pressures (WHPs), may be provided by each well controller back to the central controller to assist the central controller in generating and/or updating the optimal allocation solution.

It will further be appreciated that the allocation of functionality between a central, oilfield-wide controller and one or more well controllers may vary from the allocation of functionality found in the embodiments disclosed specifically herein. In some embodiments, for example, a central controller may also function as a well controller. Still other embodiments may be envisioned, and as such, the invention is not limited to the particular embodiments disclosed herein.

Thus, in some embodiments, a method is provided for performing oilfield-wide production optimization in a field including a plurality of wells, with each well including a well flow rate management mechanism controlled by an associated well controller. The method includes, in a central controller accessing a network simulation model as a proxy of the field to determine an optimal allocation solution for the field, generating a well-specific control signal for each of the plurality of wells based upon the determined optimal allocation solution, and communicating the well-specific control signal for each of the plurality of wells to cause the associated well controller to control a flow rate management parameter associated with the well flow rate management mechanism for the well.

In some embodiments, accessing the network simulation model includes iteratively converging to the optimal allocation solution, while in some embodiments, iteratively converging to the optimal allocation solution includes converging based upon a network solution determined from the network simulation model, and in some embodiments, iteratively converging to the optimal allocation solution includes converging based upon actual field data collected from at least one of the plurality of wells.

Some embodiments further include running an oilfield-wide simulation to generate the network simulation model, and some embodiments further include generating a well-specific model for each of the plurality of wells. Some embodiments also include generating a descriptive proxy model representing an oilfield-wide simulation, where generating the well-specific control signal for each of the plurality of wells includes generating the well-specific control signal using the descriptive proxy model representing the oilfield-wide simulation. Some embodiments include generating a descriptive proxy model for each of the plurality of wells from the well-specific model for each of the plurality of wells, where generating the well-specific control signal for each of the plurality of wells includes generating the well-specific control signal using the descriptive proxy model for each of the plurality of wells. In addition, in some embodiments, running the oilfield-wide simulation and generating descriptive proxy model are performed externally to the central controller, and the network simulation model and each descriptive proxy model are communicated to the central controller. Further, in some embodiments, the descriptive proxy model includes a set of performance curves, a set of performance surfaces, or an n-dimensional analytical representation. Some embodiments also include collecting actual field data and retuning at least one well-specific model in response to determining from the collected actual field data that the optimal allocation solution is out of tolerance.

In some embodiments, the well flow rate management mechanism for at least one well includes a gas lift mechanism, and the flow rate management parameter for at least one well includes a gas lift rate. In some embodiments, the well flow rate management mechanism for at least one well includes a pump-based artificial lift mechanism, and the flow rate management parameter for at least one well includes an electrical power, a pump rate, or a power fluid flow rate. In some embodiments, the well flow rate management mechanism for at least one well includes a flow restriction device, and the flow rate management parameter for at least one well includes an allowed flow rate or a position or setting of the flow restriction device. Further, in some embodiments, the well flow rate management mechanism for at least one well includes a chemical stimulation mechanism, and the flow rate management parameter for at least one well includes a quantity, flow rate, or concentration level of a chemical stimulant. In addition, in some embodiments, at least two wells include different types of well flow rate management mechanisms, and the flow rate management parameters for the at least two wells are of different types. Further, in some embodiments, at least one well include multiple types of well flow rate management mechanisms, and determining the optimal allocation solution for the field includes simultaneously determining multiple respective flow rate management parameters for the multiple types of well flow rate management mechanisms for the at least one well.

Other embodiments may include a central controller including at least one processor and program code configured upon execution by the at least one processor to perform any of the above-described operations. Still other embodiments may include a computer readable storage medium having a set of computer-readable instructions residing thereon that, when executed, perform any of the above-described operations upon execution by a central controller.

Other variations and modifications will be apparent to one of ordinary skill in the art.

Oilfield Operations

Turning now to the drawings, wherein like numbers denote like parts throughout the several views, FIGS. 1A-1D illustrate simplified, schematic views of an oilfield 100 having subterranean formation 102 containing reservoir 104 therein in accordance with implementations of various technologies and techniques described herein. FIG. 1A illustrates a survey operation being performed by a survey tool, such as seismic truck 106.1, to measure properties of the subterranean formation. The survey operation is a seismic survey operation for producing sound vibrations. In FIG. 1A, one such sound vibration, sound vibration 112 generated by source 110, reflects off horizons 114 in earth formation 116. A set of sound vibrations is received by sensors, such as geophone-receivers 118, situated on the earth's surface. The data received 120 is provided as input data to a computer 122.1 of a seismic truck 106.1, and responsive to the input data, computer 122.1 generates seismic data output 124. This seismic data output may be stored, transmitted or further processed as desired, for example, by data reduction.

FIG. 1B illustrates a drilling operation being performed by drilling tools 106.2 suspended by rig 128 and advanced into subterranean formations 102 to form wellbore 136. Mud pit 130 is used to draw drilling mud into the drilling tools via flow line 132 for circulating drilling mud down through the drilling tools, then up wellbore 136 and back to the surface. The drilling mud may be filtered and returned to the mud pit. A circulating system may be used for storing, controlling, or filtering the flowing drilling muds. The drilling tools are advanced into subterranean formations 102 to reach reservoir 104. Each well may target one or more reservoirs. The drilling tools are adapted for measuring downhole properties using logging while drilling tools. The logging while drilling tools may also be adapted for taking core sample 133 as shown.

Computer facilities may be positioned at various locations about the oilfield 100 (e.g., the surface unit 134) and/or at remote locations. Surface unit 134 may be used to communicate with the drilling tools and/or offsite operations, as well as with other surface or downhole sensors. Surface unit 134 is capable of communicating with the drilling tools to send commands to the drilling tools, and to receive data therefrom. Surface unit 134 may also collect data generated during the drilling operation and produces data output 135, which may then be stored or transmitted.

Sensors (S), such as gauges, may be positioned about oilfield 100 to collect data relating to various oilfield operations as described previously. As shown, sensor (S) is positioned in one or more locations in the drilling tools and/or at rig 128 to measure drilling parameters, such as weight on bit, torque on bit, pressures, temperatures, flow rates, compositions, rotary speed, and/or other parameters of the field operation. Sensors (S) may also be positioned in one or more locations in the circulating system.

Drilling tools 106.2 may include a bottom hole assembly (BHA) (not shown), generally referenced, near the drill bit (e.g., within several drill collar lengths from the drill bit). The bottom hole assembly includes capabilities for measuring, processing, and storing information, as well as communicating with surface unit 134. The bottom hole assembly further includes drill collars for performing various other measurement functions.

The bottom hole assembly may include a communication subassembly that communicates with surface unit 134. The communication subassembly is adapted to send signals to and receive signals from the surface using a communications channel such as mud pulse telemetry, electro-magnetic telemetry, or wired drill pipe communications. The communication subassembly may include, for example, a transmitter that generates a signal, such as an acoustic or electro-magnetic signal, which is representative of the measured drilling parameters. It will be appreciated by one of skill in the art that a variety of telemetry systems may be employed, such as wired drill pipe, electromagnetic or other known telemetry systems.

Generally, the wellbore is drilled according to a drilling plan that is established prior to drilling. The drilling plan sets forth equipment, pressures, trajectories and/or other parameters that define the drilling process for the wellsite. The drilling operation may then be performed according to the drilling plan. However, as information is gathered, the drilling operation may need to deviate from the drilling plan. Additionally, as drilling or other operations are performed, the subsurface conditions may change. The earth model may also need adjustment as new information is collected The data gathered by sensors (S) may be collected by surface unit 134 and/or other data collection sources for analysis or other processing. The data collected by sensors (S) may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

Surface unit 134 may include transceiver 137 to allow communications between surface unit 134 and various portions of the oilfield 100 or other locations. Surface unit 134 may also be provided with or functionally connected to one or more controllers (not shown) for actuating mechanisms at oilfield 100. Surface unit 134 may then send command signals to oilfield 100 in response to data received. Surface unit 134 may receive commands via transceiver 137 or may itself execute commands to the controller. A processor may be provided to analyze the data (locally or remotely), make the decisions and/or actuate the controller. In this manner, oilfield 100 may be selectively adjusted based on the data collected. This technique may be used to optimize portions of the field operation, such as controlling drilling, weight on bit, pump rates, or other parameters. These adjustments may be made automatically based on computer protocol, and/or manually by an operator. In some cases, well plans may be adjusted to select optimum operating conditions, or to avoid problems.

FIG. 1C illustrates a wireline operation being performed by wireline tool 106.3 suspended by rig 128 and into wellbore 136 of FIG. 1B. Wireline tool 106.3 is adapted for deployment into wellbore 136 for generating well logs, performing downhole tests and/or collecting samples. Wireline tool 106.3 may be used to provide another method and apparatus for performing a seismic survey operation. Wireline tool 106.3 may, for example, have an explosive, radioactive, electrical, or acoustic energy source 144 that sends and/or receives electrical signals to surrounding subterranean formations 102 and fluids therein.

Wireline tool 106.3 may be operatively connected to, for example, geophones 118 and a computer 122.1 of a seismic truck 106.1 of FIG. 1A. Wireline tool 106.3 may also provide data to surface unit 134. Surface unit 134 may collect data generated during the wireline operation and may produce data output 135 that may be stored or transmitted. Wireline tool 106.3 may be positioned at various depths in the wellbore 136 to provide a survey or other information relating to the subterranean formation 102.

Sensors (S), such as gauges, may be positioned about oilfield 100 to collect data relating to various field operations as described previously. As shown, sensor S is positioned in wireline tool 106.3 to measure downhole parameters which relate to, for example porosity, permeability, fluid composition and/or other parameters of the field operation.

FIG. 1D illustrates a production operation being performed by production tool 106.4 deployed from a production unit or Christmas tree 129 and into completed wellbore 136 for drawing fluid from the downhole reservoirs into surface facilities 142. The fluid flows from reservoir 104 through perforations in the casing (not shown) and into production tool 106.4 in wellbore 136 and to surface facilities 142 via gathering network 146.

Sensors (S), such as gauges, may be positioned about oilfield 100 to collect data relating to various field operations as described previously. As shown, the sensor (S) may be positioned in production tool 106.4 or associated equipment, such as christmas tree 129, gathering network 146, surface facility 142, and/or the production facility, to measure fluid parameters, such as fluid composition, flow rates, pressures, temperatures, and/or other parameters of the production operation.

Production may also include injection wells for added recovery. One or more gathering facilities may be operatively connected to one or more of the wellsites for selectively collecting downhole fluids from the wellsite(s).

While FIGS. 1B-1D illustrate tools used to measure properties of an oilfield, it will be appreciated that the tools may be used in connection with non-oilfield operations, such as gas fields, mines, aquifers, storage, or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors (S) may be located at various positions along the wellbore and/or the monitoring tools to collect and/or monitor the desired data. Other sources of data may also be provided from offsite locations.

The field configurations of FIGS. 1A-1D are intended to provide a brief description of an example of a field usable with oilfield application frameworks. Part, or all, of oilfield 100 may be on land, water, and/or sea. Also, while a single field measured at a single location is depicted, oilfield applications may be utilized with any combination of one or more oilfields, one or more processing facilities and one or more wellsites.

FIG. 2 illustrates a schematic view, partially in cross section of oilfield 200 having data acquisition tools 202.1, 202.2, 202.3 and 202.4 positioned at various locations along oilfield 200 for collecting data of subterranean formation 204 in accordance with implementations of various technologies and techniques described herein. Data acquisition tools 202.1-202.4 may be the same as data acquisition tools 106.1-106.4 of FIGS. 1A-1D, respectively, or others not depicted. As shown, data acquisition tools 202.1-202.4 generate data plots or measurements 208.1-208.4, respectively. These data plots are depicted along oilfield 200 to demonstrate the data generated by the various operations.

Data plots 208.1-208.3 are examples of static data plots that may be generated by data acquisition tools 202.1-202.3, respectively, however, it should be understood that data plots 208.1-208.3 may also be data plots that are updated in real time. These measurements may be analyzed to better define the properties of the formation(s) and/or determine the accuracy of the measurements and/or for checking for errors. The plots of each of the respective measurements may be aligned and scaled for comparison and verification of the properties.

Static data plot 208.1 is a seismic two-way response over a period of time. Static plot 208.2 is core sample data measured from a core sample of the formation 204. The core sample may be used to provide data, such as a graph of the density, porosity, permeability, or some other physical property of the core sample over the length of the core. Tests for density and viscosity may be performed on the fluids in the core at varying pressures and temperatures. Static data plot 208.3 is a logging trace that generally provides a resistivity or other measurement of the formation at various depths.

A production decline curve or graph 208.4 is a dynamic data plot of the fluid flow rate over time. The production decline curve generally provides the production rate as a function of time. As the fluid flows through the wellbore, measurements are taken of fluid properties, such as flow rates, pressures, composition, etc.

Other data may also be collected, such as historical data, user inputs, economic information, and/or other measurement data and other parameters of interest. As described below, the static and dynamic measurements may be analyzed and used to generate models of the subterranean formation to determine characteristics thereof. Similar measurements may also be used to measure changes in formation aspects over time.

The subterranean structure 204 has a plurality of geological formations 206.1-206.4. As shown, this structure has several formations or layers, including a shale layer 206.1, a carbonate layer 206.2, a shale layer 206.3 and a sand layer 206.4. A fault 207 extends through the shale layer 206.1 and the carbonate layer 206.2. The static data acquisition tools are adapted to take measurements and detect characteristics of the formations.

While a specific subterranean formation with specific geological structures is depicted, it will be appreciated that oilfield 200 may contain a variety of geological structures and/or formations, sometimes having extreme complexity. In some locations, generally below the water line, fluid may occupy pore spaces of the formations. Each of the measurement devices may be used to measure properties of the formations and/or its geological features. While each acquisition tool is shown as being in specific locations in oilfield 200, it will be appreciated that one or more types of measurement may be taken at one or more locations across one or more fields or other locations for comparison and/or analysis.

The data collected from various sources, such as the data acquisition tools of FIG. 2, may then be processed and/or evaluated. Generally, seismic data displayed in static data plot 208.1 from data acquisition tool 202.1 is used by a geophysicist to determine characteristics of the subterranean formations and features. The core data shown in static plot 208.2 and/or log data from well log 208.3 are generally used by a geologist to determine various characteristics of the subterranean formation. The production data from graph 208.4 is generally used by the reservoir engineer to determine fluid flow reservoir characteristics. The data analyzed by the geologist, geophysicist and the reservoir engineer may be analyzed using modeling techniques.

Figure 3:
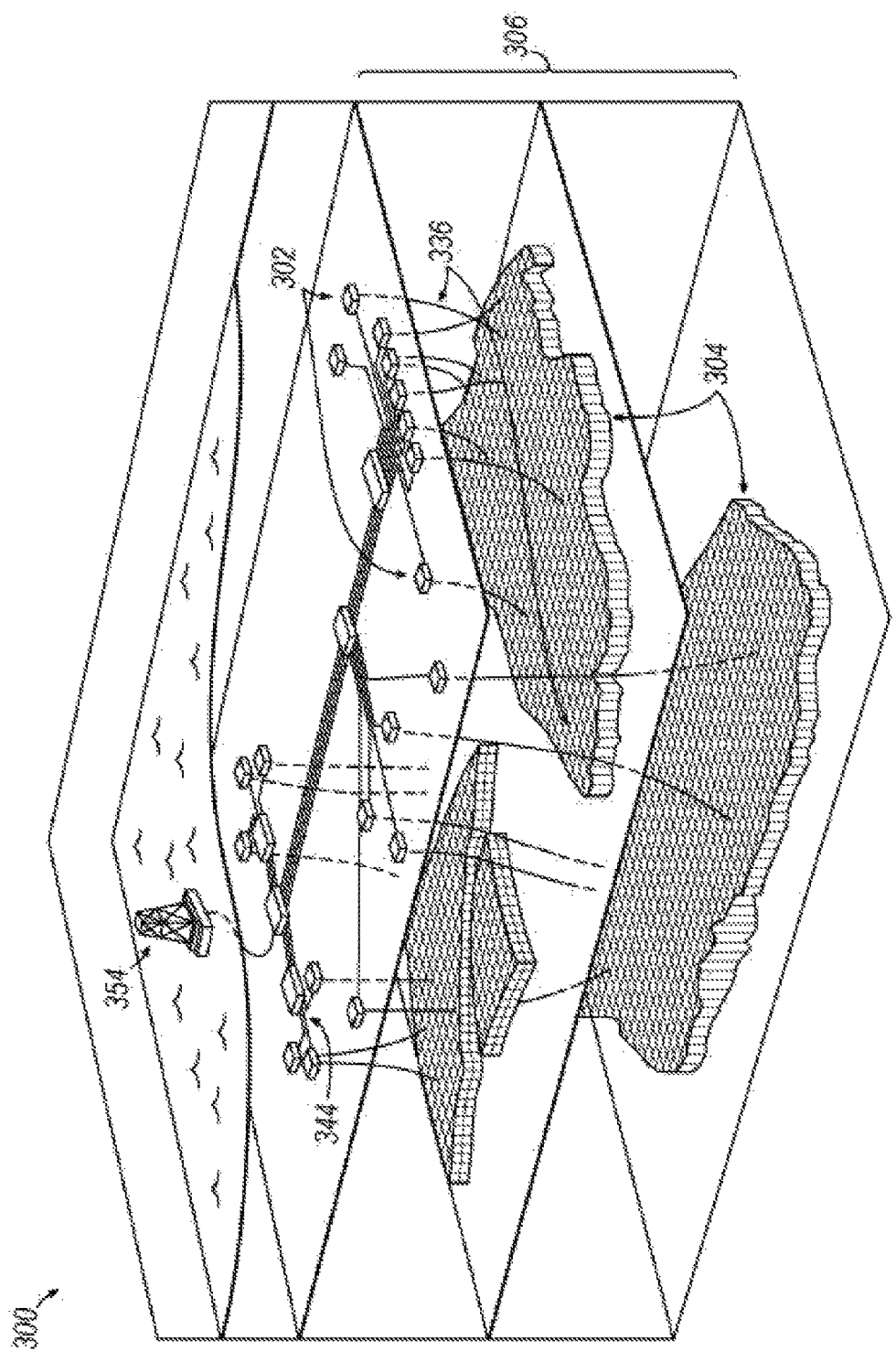
FIG. 3 illustrates a production system for performing one or more oilfield operations in accordance with implementations of various technologies and techniques described herein.

FIG. 3 illustrates an oilfield 300 for performing production operations in accordance with implementations of various technologies and techniques described herein. As shown, the oilfield has a plurality of wellsites 302 operatively connected to central processing facility 354. The oilfield configuration of FIG. 3 is not intended to limit the scope of the oilfield application system. Part or all of the oilfield may be on land and/or sea. Also, while a single oilfield with a single processing facility and a plurality of wellsites is depicted, any combination of one or more oilfields, one or more processing facilities and one or more wellsites may be present.

Each wellsite 302 has equipment that forms wellbore 336 into the earth. The wellbores extend through subterranean formations 306 including reservoirs 304. These reservoirs 304 contain fluids, such as hydrocarbons. The wellsites draw fluid from the reservoirs and pass them to the processing facilities via surface networks 344. The surface networks 344 have tubing and control mechanisms for controlling the flow of fluids from the wellsite to processing facility 354.

Oilfield-Wide Production Optimization

Embodiments consistent with the invention may be used to implement, at the central controller level of a distributed well flow rate control system, oilfield-wide control of flow rate management parameters for a plurality of wells in an oilfield based upon large-scale field optimization techniques. Flow rate management parameters, within the context of the invention, may refer to various types of control parameters that may be used to control the well fluid flow rate of a well, and will generally vary based upon the type of well flow rate management mechanism for which such parameters may be used to control. Furthermore, such parameters are effectively used to allocate, to each well, a portion of one or more scarce resources that are available in an oilfield production system.

For example, for well flow rate management mechanisms such as gas-based artificial lift mechanisms, the scarce resource may be considered to be a quantity or total available flow rate of a lift gas such as natural gas, field gas, carbon dioxide, etc., while the relevant flow rate management parameter for a particular well may relate to a flow rate of lift gas to that well. In contrast, for well flow rate management mechanisms such as electro-submersible pumps (ESPs), progressing cavity pumps (PCPs), sucker rod pumps (SRPs), or other types of pumps, the scarce resource may be considered to be electrical power, e.g., in terms of horsepower, watts, current, etc., while the relevant flow rate management parameter for a particular well may relate to electrical power, e.g., the amount of available electrical power allocated to that well. In contrast, for well flow rate management mechanisms such as hydraulic jet pumps and hydraulic piston pumps or other types of pumps, the scarce resource may be considered to be hydraulic power, e.g., in terms of pressure and flow rate of a high pressure power fluid, etc., while the relevant flow rate management parameter for a particular well may relate to flow rate, e.g., the amount of available pressurized power fluid allocated to that well. Further, for some pumps, the scarce resource may be a resource that is effectively related to electrical power within a pump context, e.g., a collective maximum output for pumps across multiple wells, while the relevant flow rate management parameter may relate to a pump speed, pump rate or power fluid flow rate for an individual pump, since electrical power requirements for a pump are generally proportional to pump speed or rate. For well flow rate management mechanisms such as chokes and other flow restriction devices, the scare resource may be considered to be a collective maximum flow rate across multiple wells, or a sum of maximum valve opening areas of the flow restriction devices across multiple wells, while the relevant flow rate management parameter for a particular well may be an allowed flow rate related to the amount of flow allowed through the flow restriction device, or a position or setting of the flow restriction device between fully open and fully closed. In other embodiments, however, there may not be an oilfield-wide limit on a sum of maximum value opening areas, and the scare resource may be limited more in terms of system constraints such as maximum drawdown in wells (e.g., to avoid coning, breakthrough, etc.), maximum liquid handling or water handling capacity in surface facilities, slugging and surging, etc. Also, for well flow rate management techniques such as chemical stimulation, the scarce resource may be considered to be an available quantity or available flow rate of a chemical stimulant, while the relevant flow rate management parameter for a particular well may relate to a quantity, flow rate, concentration level, or other parameter that controls the relative level of activation of the chemical stimulant.

In some embodiments consistent with the invention, a central controller is configured to optimize, subject to constraints such as drawdown, gas handling, etc., a marginal rate of return for each of a plurality of wells in an oilfield based upon the available scarce resources in an attempt to optimize production oilfield-wide. To do so, one or more flow rate management parameters associated with one or more well flow rate management mechanisms or technologies implemented in the plurality of wells are effectively used to allocate portions of one or more scarce resources to each well.

Figure 4:
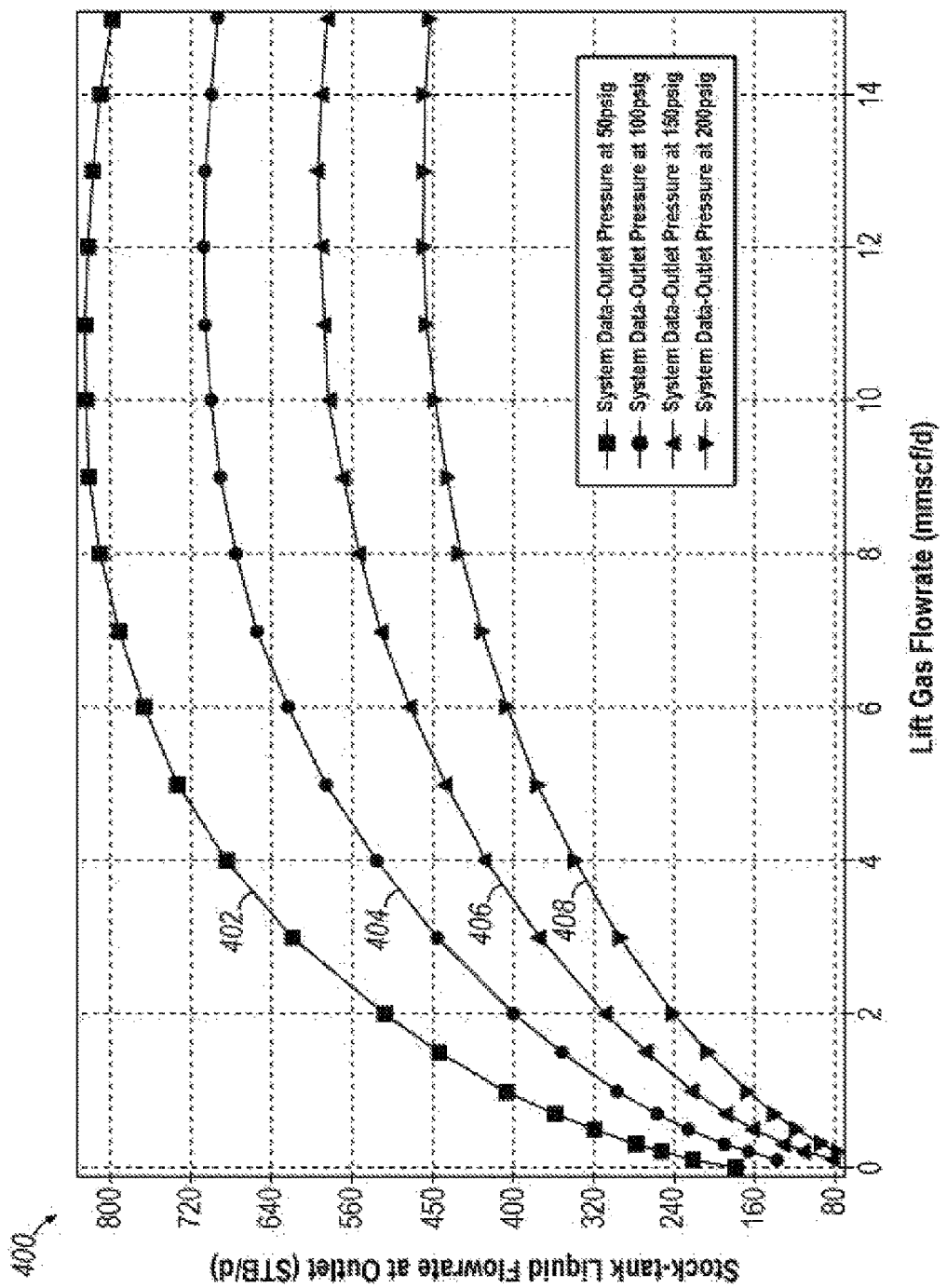
FIG. 4 illustrates a chart in accordance with implementations of various technologies and techniques described herein.

To establish suitable parameters, some embodiments may rely on sets of performance curves that plot output wellbore production liquid flow rates against values of a relevant flow rate management parameter under various overall system conditions. As an example, for gas-based artificial lift mechanisms, for a given value of tubing head pressure, gas-lifted wells may generally be thought of a having one input (lift gas flow rate) and one output (produced liquid). For each well, the gas lift well model that is calculated now or created when initially designing a gas lift completion may be used to compute gas lift well performance curves, as illustrated conceptually in FIG. 4 at 400. Each gas lift well performance curve indicates the output wellbore production liquid flow rate versus the input injected lift gas flow rate (here serving as the flow rate management parameter in this implementation). A family of performance curves may be computed for a set of wellhead flowing pressures (i.e. the surface network back-pressure against which the well produces). For a given value of injected lift gas flow rate, a higher value of wellhead flowing pressure (higher back-pressure) results in a smaller wellbore production liquid flow rate. More particularly, the gas lift well performance curves include a first performance curve 402 illustrating the output wellbore production liquid flow rate with a wellhead flowing pressure at 50 psig, a second performance curve 404 illustrating the output wellbore production liquid flow rate with a wellhead flowing pressure at 100 psig, a third performance curve 406 illustrating the output wellbore production liquid flow rate with a wellhead flowing pressure at 150 psig, and a fourth performance curve 408 illustrating the output wellbore production liquid flow rate with a wellhead flowing pressure at 200 psig.

It will be appreciated that for other types of well flow rate management mechanisms, similar sets of performance curves may be developed to generally plot output wellbore production liquid flow rates against values of a relevant flow rate management parameter.

Figure 5:
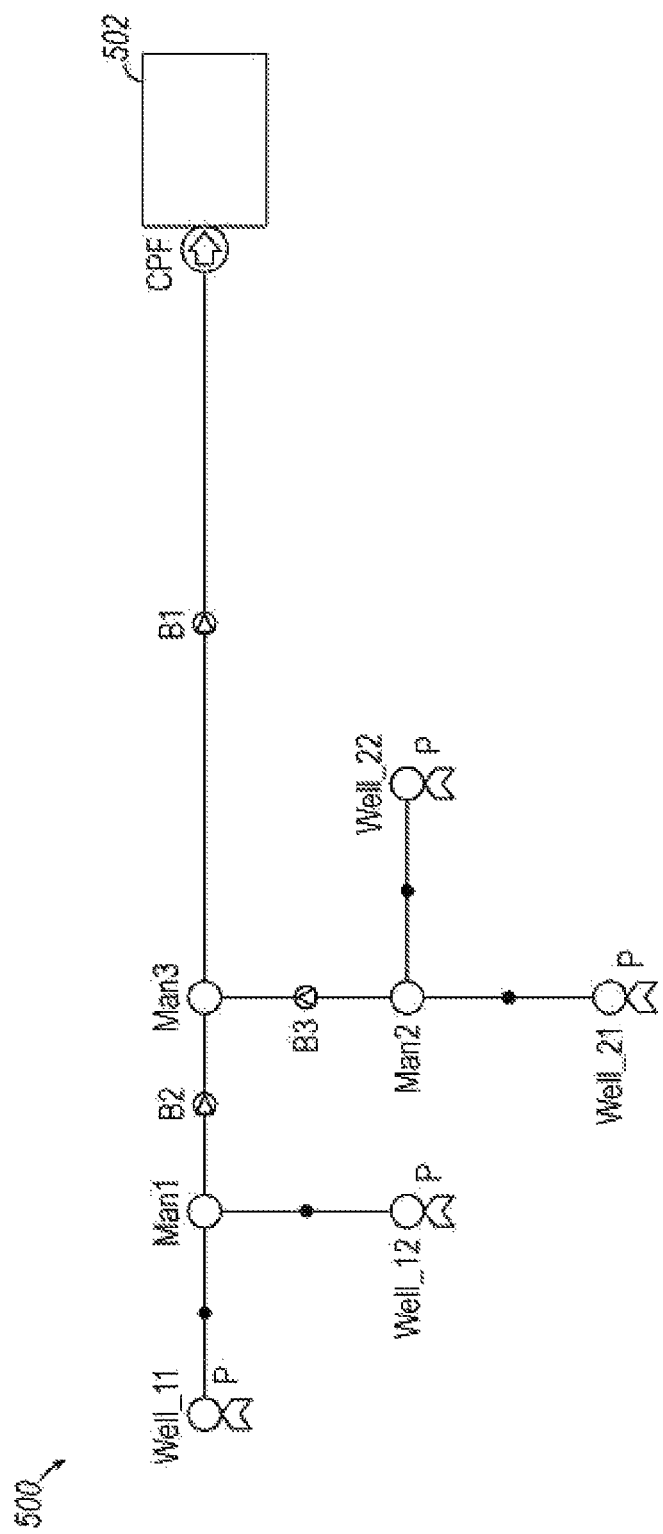
FIG. 5 illustrates a schematic illustration of embodiments in accordance with implementations of various technologies and techniques described herein.

As illustrated at 500 in FIG. 5, in some implementations, wells (e.g., "Well_11", "Well_12", "Well_21", and "Well_22") may generally be coupled to one another to form a surface network. In a field comprising N wells, the outputs of the N wells flow into a production network, e.g., a surface production network. The production network may include a series of surface flow lines that collect the liquid and gas production from the wells and gather it at a production facility 502 that may, for example, separate the oil, water and gas phases. Because the wells are inter-connected through the production network 500, the production from one well can influence or interfere with the production from another well. For example, if one well's production rate increases to a high value, this may elevate the pressure in the production network 500 and result in production from other wells of the production network 500 to decrease. Addressing the interaction of pressure through the production network 500 makes field-wide production optimization more difficult than optimizing a single well.

In addition, during certain field operations, several measurements may be made for wells, and may be repeated at predetermined intervals. For example, for gas-based artificial lift mechanisms, the following measurements may be made: injected lift gas pressure and flow rate (which, in some embodiments, may be measured daily); well production liquid flow rate, gas-oil ratio (GOR) and water cut (i.e., ratio of water flow rate to liquid flow rate, which is generally taken during occasional well tests, e.g., every few weeks); wellhead flowing temperature and pressure (which, in some embodiments, may be measured hourly or daily); and static reservoir pressure (which may be computed from time to time as a result of pressure transient analysis of well shut-in pressure data). In some embodiments, these measurements may be used to determine how to control a production network 500 to achieve a particular production target. Similar measurements may be made for wells incorporating other types of well flow rate management mechanisms, as will be appreciated by those of ordinary skill in the art having the benefit of the instant disclosure.

U.S. PGPub. No. 2012/0215364, filed by David Rossi on Feb. 17, 2012, assigned to the same assignee as the present application, and which is incorporated by reference herein in its entirety, is generally directed to a distributed control system in which a central controller distributes a single oilfield-wide slope control variable to a plurality of well controllers to set desired gas lift rates for a plurality of wells in the oilfield. In such a system, the central controller may employ a gas lift resource distribution procedure based on a desired slope solution. It has been found, however, that in some instances, such a distributed control system is limited in that at times the choice for a slope solution may be unclear, initial condition requirements may not be specified, and an optimal solution may not be returned. In addition, uniqueness of a solution may require well curves to present monotonic behavior, and well controllers may have to handle constraints locally, which may limit the treatment of field-level constraints. Such a procedure may also take a long time to converge physically to a steady-state solution.

As such, in some embodiments consistent with the invention, it may be desirable to implement a distributed control system in which curve validation and constraint management are performed within a central controller. Furthermore, it may be desirable in such embodiments to apply a well flow rate management optimization solution based on large-scale network optimization techniques within the central controller to provide a single-valued solution for a plurality of wells in an oilfield, e.g., using techniques such as described in U.S. Pat. No. 8,670,966, filed by Rashid et al. on Aug. 4, 2009, U.S. Pat. No. 8,078,444, filed by Rashid et al. on Dec. 6, 2007, and U.S. Pat. No. 7,953,584, filed by Rashid et al. on Feb. 27, 2007, each of which is assigned to the same assignee as the present application, and each of which is incorporated by reference in its entirety. Such solutions generally employ the Newton Reduction Method (NRM) for convex well-posed cases and a genetic algorithm (GA) for non-convex cases with mid-network constraints applied, and generally with constraints managed using penalty forms.

Accordingly, in embodiments consistent with the invention, an oilfield-wide simulation may be run to develop a network simulation model as a proxy for the oilfield that generates performance curves for each among a plurality of wells in the oilfield based upon backpressure effects and other interrelationships between wells in the oilfield calculated using a network simulation model. This proxy may, in turn, be used by a central controller to determine flow rate management set points for each well that represent an optimal allocation solution for the oilfield as a whole. Doing so enables optimal allocation of the scarce resource(s) involved (using the various large-scale network optimization techniques, including penalty, constraint, and well activation management), while delaying control of individual well controllers until a steady state solution has been estimated.

Figure 6:
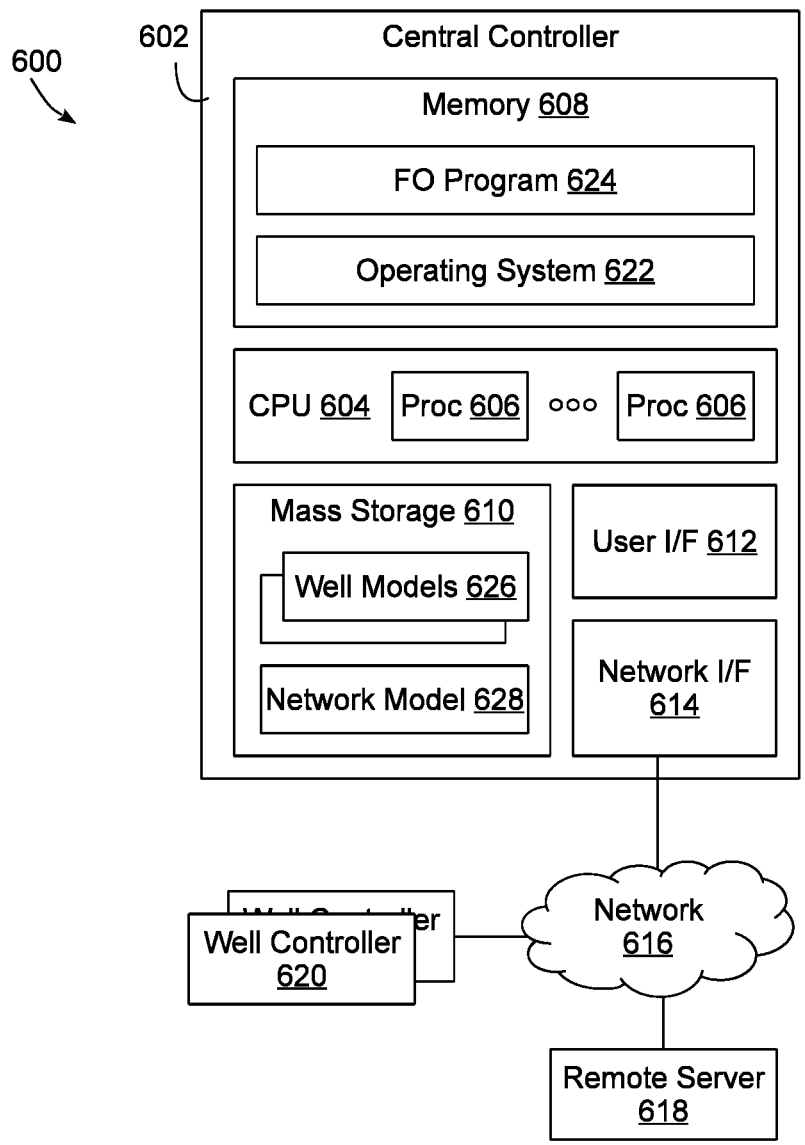
FIG. 6 is a block diagram of an example hardware and software environment for a data processing system in accordance with implementation of various technologies and techniques described herein.

FIG. 6 illustrates an example data processing system 600 in which the various technologies and techniques described herein may be implemented. System 600 is illustrated as including a central controller 602 including a central processing unit (CPU) 604 including at least one hardware-based processor or processing core 606. CPU 604 is coupled to a memory 608, which may represent the random access memory (RAM) devices comprising the main storage of central controller 602, as well as any supplemental levels of memory, e.g., cache memories, non-volatile or backup memories (e.g., programmable or flash memories), read-only memories, etc. In addition, memory 608 may be considered to include memory storage physically located elsewhere in central controller 602, e.g., any cache memory in a microprocessor or processing core, as well as any storage capacity used as a virtual memory, e.g., as stored on a mass storage device 610 or on another computer coupled to central controller 602.

Central controller 602 also generally receives a number of inputs and generates a number of outputs for communicating information externally. For interface with a user or operator, central controller 602 generally includes a user interface 612 incorporating one or more user input/output devices, e.g., a keyboard, a pointing device, a display, a printer, etc. Otherwise, user input may be received, e.g., over a network interface 614 coupled to a communication network 616, from one or more external computers, e.g., one or more remote servers 618 and one or more well controllers 620. Central controller 602 also may be in communication with one or more mass storage devices 610, which may be, for example, internal hard disk storage devices, external hard disk storage devices, storage area network devices, etc.

Central controller 602 generally operates under the control of an operating system 622 and executes or otherwise relies upon various computer software applications, components, programs, objects, modules, data structures, etc. For example, a field optimization (FO) program 624 may be used to implement a field-wide, distributed real-time production optimization solution, e.g., based upon a set of well models 626 and network model 628 stored locally in mass storage 610 and/or accessible remotely from a remote server 618. In this regard, in some embodiments of the invention, the term well model may be used to refer to a simulation model for a single wellbore, and the term network model may be used to refer to a simulation model for a surface network and all of the wellbore models connected to that surface network. In some instances, for example, a network model may be considered to include a full-field or combined simulation model that includes reservoir, wells, network and facilities models that may be used to predict the effects of a distributed scarce resource on overall field production (e.g., total oil, etc.).

In general, the routines executed to implement the embodiments disclosed herein, whether implemented as part of an operating system or a specific application, component, program, object, module or sequence of instructions, or even a subset thereof, will be referred to herein as "computer program code," or simply "program code." Program code generally comprises one or more instructions that are resident at various times in various memory and storage devices in a computer, and that, when read and executed by one or more hardware-based processing units in a computer (e.g., microprocessors, processing cores, or other hardware-based circuit logic), cause that computer to perform the steps embodying desired functionality. Moreover, while embodiments have and hereinafter will be described in the context of fully functioning computers and computer systems, those skilled in the art will appreciate that the various embodiments are capable of being distributed as a program product in a variety of forms, and that the invention applies equally regardless of the particular type of computer readable media used to actually carry out the distribution.

Such computer readable media may include computer readable storage media and communication media. Computer readable storage media is non-transitory in nature, and may include volatile and non-volatile, and removable and non-removable media implemented in any method or technology for storage of information, such as computer-readable instructions, data structures, program modules or other data. Computer readable storage media may further include RAM, ROM, erasable programmable read-only memory (EPROM), electrically erasable programmable read-only memory (EEPROM), flash memory or other solid state memory technology, CD-ROM, DVD, or other optical storage, magnetic cassettes, magnetic tape, magnetic disk storage or other magnetic storage devices, or any other medium that can be used to store the desired information and which can be accessed by central controller 600. Communication media may embody computer readable instructions, data structures or other program modules. By way of example, and not limitation, communication media may include wired media such as a wired network or direct-wired connection, and wireless media such as acoustic, RF, infrared and other wireless media. Combinations of any of the above may also be included within the scope of computer readable media.

Various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program functionality described herein.

Furthermore, it will be appreciated by those of ordinary skill in the art having the benefit of the instant disclosure that the various operations described herein that may be performed by any program code, or performed in any routines, workflows, or the like, may be combined, split, reordered, omitted, and/or supplemented with other techniques known in the art, and therefore, the invention is not limited to the particular sequences of operations described herein.

Those skilled in the art will recognize that the example environment illustrated in FIG. 6 is not intended to limit the invention. Indeed, those skilled in the art will recognize that other alternative hardware and/or software environments may be used without departing from the scope of the invention.

Figure 7:
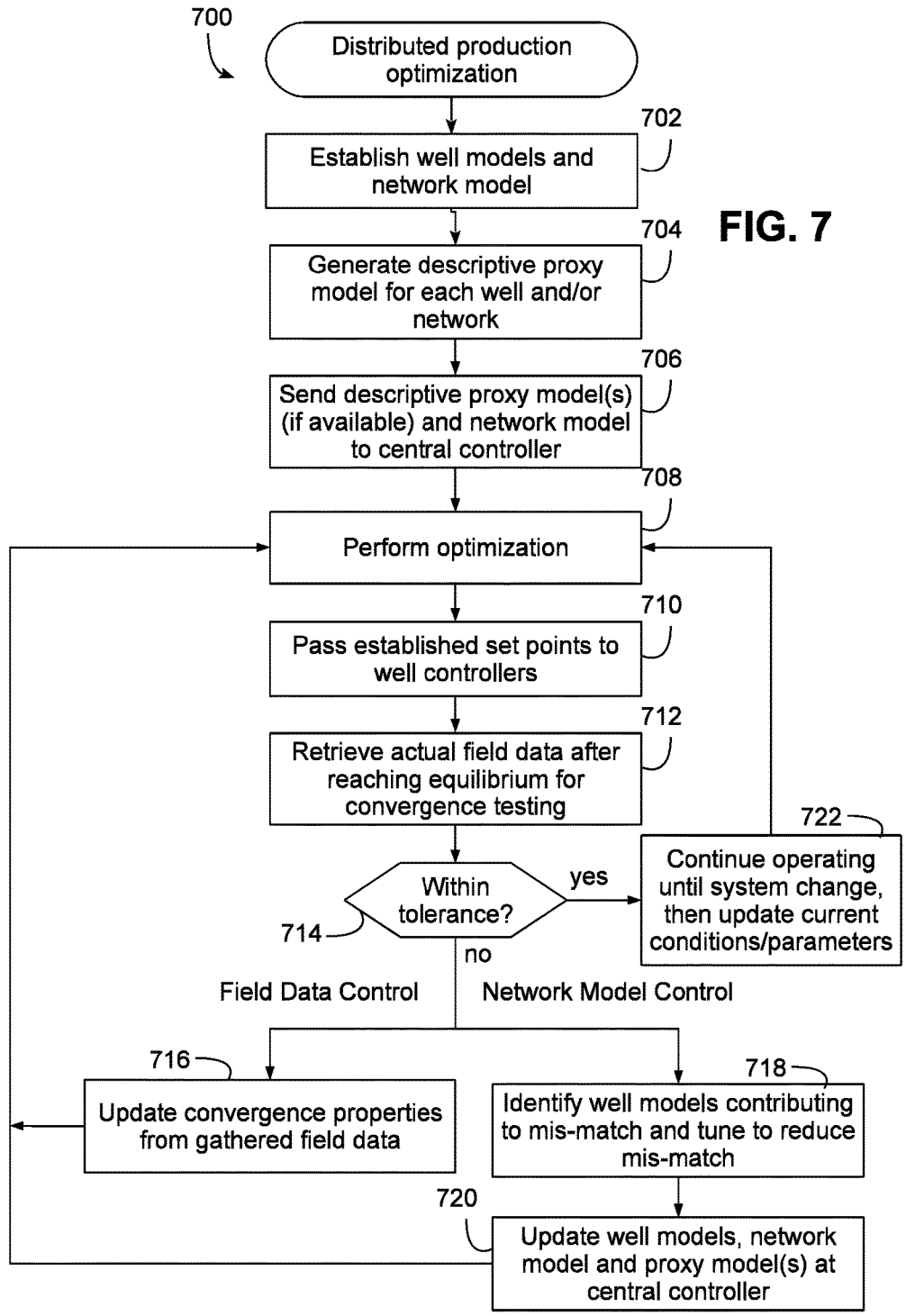
FIG. 7 is a flowchart illustrating an example sequence of operations for performing distributed production optimization in accordance with implementation of various technologies and techniques described herein.

Now turning to FIG. 7, a distributed oilfield-wide production optimization routine 700 in accordance with the principles of the invention is illustrated in greater detail. Routine 700 is primarily performed and coordinated using a central controller, e.g., central controller 602 of FIG. 6, although some steps may be performed by other components in data processing system 600. For example, as illustrated in blocks 702-704, routine 700 initially establishes a well model for each well in the field and a network model for the surface network (block 702) and then generates a descriptive proxy model for each well and/or the surface network (block 704). A descriptive proxy model may be, for example, a set of performance curves, surfaces or other n-dimensional analytical representation. In the illustrated embodiment, blocks 702 and 704 may be performed by a computer system remote to central controller 602, and as such, block 706 may provide the generated descriptive proxy model(s) (if available) along with the network model to central controller 602. In other embodiments, however, blocks 702 and 704 may be performed by central controller 602 such that block 706 may be omitted.

Figure 8:
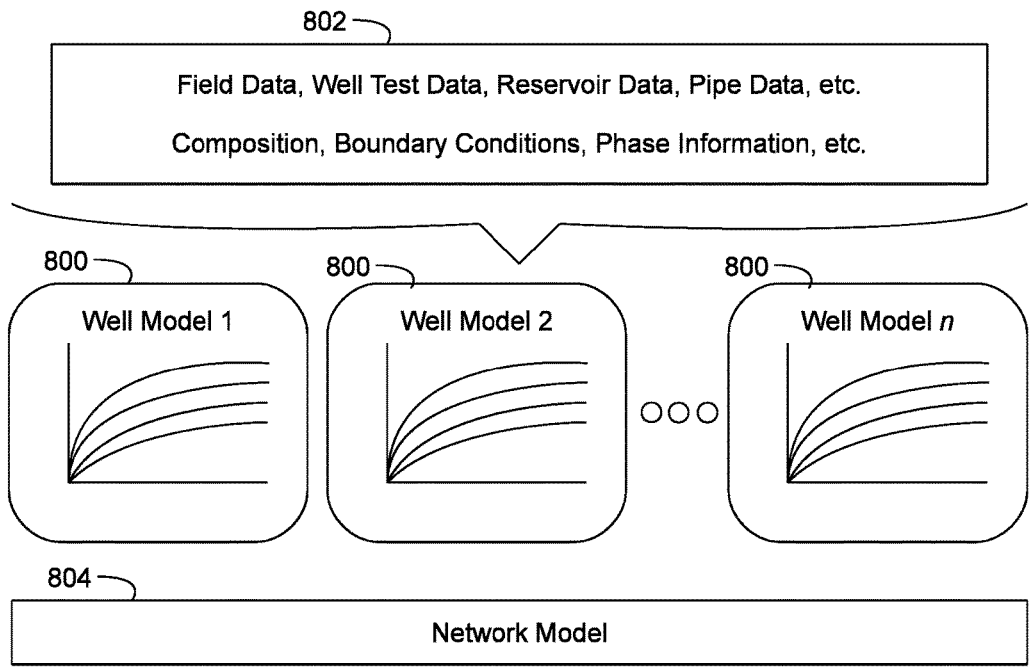
FIG. 8 illustrates generation of well and network models in accordance with implementation of various technologies and techniques described herein.

With further reference to FIG. 8, individual well models 800 may be constructed using known field rate, well test, reservoir and pipe data 802, thereby imparting knowledge of the fluids, phases and boundary conditions suitable for constructing single-well models 800 and collectively, a network model 804 representing the overall network for the field. These models enable the principal uncertainties of the optimization problem to be ascertained. For the network model, given the individual well models and the boundary conditions imposed on them at the reservoir coupling point, the network model effectively represents a thermal-hydraulic material conservation procedure that solves the pressure and flow rates at points throughout the overall system. Single-well models and a network model may be developed in a number of manners consistent with the invention, including in the various manners discussed in the aforementioned patents and publications incorporated by reference herein.

However, in the illustrated embodiment, the network model is provided to the central controller to serve as a proxy model for the overall field, such that an optimal allocation solution may be developed within the central controller. In this regard, the central controller in the illustrated embodiment is provided with both a descriptive proxy model (e.g., a set of performance curves) for each well along with a proxy model that represents a field-wide simulation that accounts for backpressure effects and other inter-well relationships within the field, and an optimal allocation solution is developed within the central controller and distributed to the various well controllers for implementation locally at each well. In some embodiments, the optimal allocation solution results in the generation of a field-wide control signal or set point, from which a set of well-specific control signals or set points is derived and distributed to each individual well controller. Thus, in contrast to the aforementioned patents and publications incorporated by reference herein, an oilfield-wide solution may be implemented within a central controller, rather than remotely from the control network of an oil field. It is believed that implementation of such functionality within a central controller improves the time to obtain an optimal solution, while also imparting greater stability in the physical implementation of the procedure. Proxy models in different embodiments may include performance curves, surfaces, some other analytical representation (in n-dimensions), or a numerical simulation model, and a proxy model may be extracted/developed for each well or the entire field using data from the network and well models. e.g., based on neural-networks, curve fitting, surface generation, etc.

In addition, in the illustrated embodiment, the central controller distributes control signals to well controllers, and may, in some instances, receive actual feedback data from the well controllers. Although a well controller normally maintains a field signal like pressure at a desired set point, a well controller in some embodiments may use measurement data and may also return these measurements to the central controller. The individual control signals are generally derived from well models or performance curves situated in the central controller and corresponding to each of the individual wells; however, in the illustrated embodiment, the well controllers are not themselves required to be provided with well models or performance curves. It will be appreciated that in some embodiments each well controller may include or may otherwise be coupled to one or more measurement instruments for determining data such as pressure and/or flow rate, so that this data can be used by the well controller and/or passed from the well controller back to the central controller.

Returning to FIG. 7, as noted above, each well model is used to provide a descriptive proxy model for each well and/or the network (block 704). These describe the well flow rate relationship with a flow rate management parameter for varying well head pressure (WHP) values, and as noted above are provided to the central controller in block 706. Thus, in block 708, in the central controller, the optimization is performed, e.g., using only the proxy model(s), in conjunction with the network model (e.g., in an iterative scheme), or using the network model alone. For example, in one embodiment, a fast analytical proxy, e.g., using an iterative offline-online method, may be used, while in another embodiment, an adaptive proxy method may be used with a simulation model, e.g., refining the model step-by-step until an optimal solution is achieved. In still another embodiment, the simulation model may be used directly. Thus, block 708 is directed to an overall optimization process, which may include problem formulation, treatment of all constraints (field-wide and well level), a solution method, an appropriate solver, etc., and the result of the optimization may be an optimal distribution that indicates the set-points intended for each well.

In some embodiments, in block 708 WHPs for the wells may be initialized and an optimization procedure may be performed using the descriptive proxy model(s) and the network model (or instead, actual WHP field data collected from the well controllers) to generate selected flow rate management parameters (representing the actual control signals) for each of the wells representing the optimal solution. WHPs may be represented by a vector, and after an initial WHP vector is generated from the network model (e.g., using any of the techniques discussed in the aforementioned patents and publications incorporated by reference), subsequent WHP vectors may be generated by either calls to the same model, or by gathering actual field data for WHP.

Once a steady state solution is obtained, the flow rate management parameters (i.e., the established set points) may then be passed to the individual well controllers in a closed-loop manner (block 710), resulting in the selected optimal solution being implemented by each of the well controllers. Thus, the optimal set points may be applied by the well controllers quickly, and once the real field reaches equilibrium, the actual field data may be retrieved for use in convergence testing, e.g., WHP, flow rates, temperatures, etc. (block 712). In some embodiments, for example, it is desirable for the real WHP vector ($P_{real}$) to agree at convergence (block 714) with the WHP vector ($P_{nw}$) calculated by the approximating model in the optimization procedure; agreement is expressed for example in terms of the norm of the difference between the two pressure vectors being less than some tolerance ($\varepsilon_{rtois}$) Consequently, if the norm of the difference between $P_{real}$ real and $P_{nw}$ is within some desired tolerance (perhaps even $\varepsilon_{rtois}$) one may assume the model is in good agreement with reality (model mis-match is low), and control may pass to block 722 to wait until one or more operating conditions and/or parameters are updated (e.g., changes in available scarce resources, constraints, etc.). Upon any relevant updates, control may then return to block 708 to repeat optimization based upon the new conditions/parameters.

On the other hand, in the convergence test (block 714), if the mis-match is much greater, one may conclude that the network model is not sufficiently accurate for predictive purposes. Under this condition, it may be desirable to enable a user to choose from two alternatives. The first alternative is to discontinue using the mis-matched network model to determine network back-pressure effects, and instead use an iterative procedure of Field Data Control based on actual field WHP data to optimize the flow rate management parameters, repeating until convergence. Block 716, which represents this alternative, updates the convergence properties based upon the gathered field data. Control then returns to block 708 to repeat the optimization procedure. In subsequent iterations of this process, both the network model and field data approaches may be run in parallel and the mismatch between the two approaches may be continually assessed; whenever desired, block 718 may be selected to calibrate the models as described next. The second alternative of Network Model Control attempts to determine why the model is mis-matched and to tune the network model until the mis-match between the modeled WHPs $P_{nw}$ and the actual field WHP data $P_{real}$ real is reduced. This is similar in concept to history matching procedures generally used in reservoir simulation. Thus, if the error is considerable, it may be indicative of unexpected well or network behavior and therefore, the need for testing or network analysis. Further investigation, tuning, performing well tests and data gathering may benefit the real field as well as the single-well models used to construct the network model. In addition, as illustrated in block 720, any new information derived from well testing or meters may be provided to the central controller to update the well models, network model and proxy model(s) in any case. Control then returns to block 708 to repeat the optimization procedure. It will be appreciated that in other embodiments, only one of these alternatives may be supported.

Figure 9:
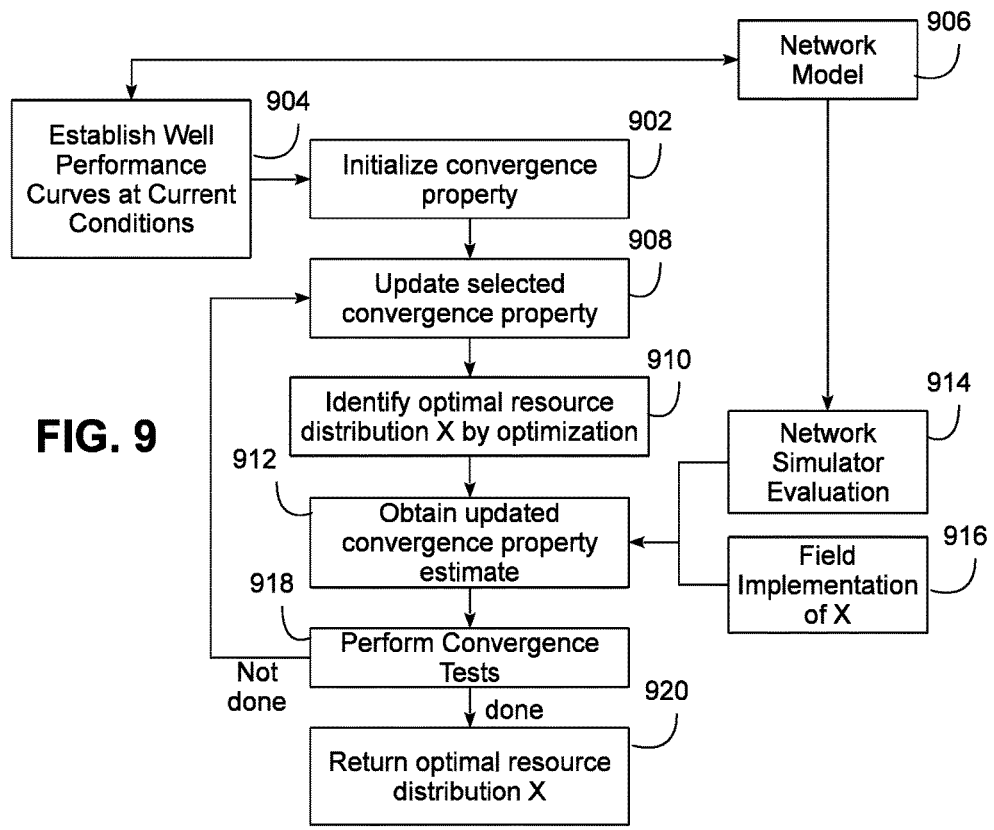
FIG. 9 is a flowchart illustrating an example sequence of operations for performing an optimization procedure for generating an optimal allocation solution in accordance with implementation of various technologies and techniques described herein.

Now turning to FIG. 9, which illustrates an implementation 900 of an optimization procedure such as implemented in block 708 of FIG. 7, it should be evident that if the network model (and the single-well models) are perfect emulators of the actual field, the optimization procedure in block 708 would provide the same result irrespective of the how the convergence property (e.g., WHP, flow rates, etc.) is obtained. In practice, however, generally due to errors and uncertainty in the data collected, as well as uncertainties in the modeling process itself, the models may not be a perfect match to reality. As such, it may be desirable in some embodiments to use actual field data in the optimization procedure, and in particular if block 716 was executed earlier in the process. However in order to obtain useful actual field data, intermediate flow rate management parameters (yielding a pseudo steady state solution) may be applied to the wells (similar to what was done earlier in block 710), and time given for each well to come to equilibrium state and the updated properties may then be read across the field (similar to what was done earlier in block 712) and returned to the central controller allowing the optimization procedure to recommence. Note that, not only may this be time consuming, but it may introduce instability in a well (and therefore the field) as intermediate solutions are physically applied at each iteration. From a practical point of view, many operational changes may in some circumstances lead to reliability issues with valves, pipes and the like, making them more prone to failure. Thus, to counter the latter, the network model may also be made available in optimization procedure 900 in some embodiments.

Therefore, as illustrated in block 902, a convergence property (e.g., WHP) may be initialized to set the operating curves based upon well performance curves established at current operational conditions (block 904, e.g., as retrieved from a network model 906). An iterative loop may then be initiated in block 908 to use the most recent value of the convergence property for each well, and then use these properties to generate an optimal resource distribution, denoted as Solution X (block 910). Thereafter, once the optimal solution X is generated, updated convergence property estimates at the new Solution X are collected (block 912). Depending on whether the solution is using a field implementation of X (block 716) or a network simulator evaluation (block 718), updated data comes from either a network simulator evaluation 914 evaluated at Solution X, or from actual data 916 collected from the field upon implementation of Solution X in the well controllers (note that block 916 implicitly includes the activities in blocks 710 and 712), and convergence tests are performed (block 918). If suitable convergence is achieved, the optimal resource distribution X is passed to block 920. Otherwise, control returns to block 908 to perform another iteration of the loop using the most recent values of the convergence property obtained in block 912.

It may, in some embodiments, be desirable to utilize a traffic light scheme (e.g., red, yellow, green) in which each well controller deduces and displays its operational efficacy with respect to the real and model data observed. For example, where a certain well employs a gas-based artificial lift mechanism, if that well has a leak in the injection line, or suffers from injection pressure loss, it may be indicative of a larger error norm component (when examined at well level) than those of other wells. The well controller may therefore display its status using a traffic light notion accordingly, suggesting that further action is desirable. The same is true with other metered information from the field in comparison to the results predicted by the single-well models or the network model.

Furthermore, it should be noted that in an established operating environment, the available scare resource (e.g., lift gas) may vary routinely. Thus, if one extracts the cumulative production profile versus the amount of available resource a priori the optimal rate allocations may be applied almost instantaneously. Collectively, with automatic well control to distribute the rates at the desired set points, the field may function at close to optimal conditions the majority of the time. Generally, if the conditions change appreciably (or new data becomes available) the single-well models and the network model may be updated accordingly, and new performance curves generated for use thereafter.

It should also be noted that in some embodiments, well controllers may take as input the current convergence property and a solution scalar indicating either the slope of the performance curve or the flow rate management parameter.

If only the slope is used at the well controller level, the effective solution may be inferred by the central controller before it is passed to the individual well controllers. This is of interest as a Newton Reduction Method (NRM) approach to optimization generally returns a slope solution (and parameters) to convex problems, but a genetic algorithm (GA) approach generally returns only the flow rate management parameter solution per well. However, it will be apparent to one of ordinary skill in the art having the benefit of the instant disclosure that as long as the well controller is provided with appropriate information, the well controller may hold the well at the desired set point (generally indicated by the performance curves held and the required convergence property). The central controller in such a scenario has the responsibility to ensure that the models are up-to-date and that the optimal solution is provided at any instance, while the well controllers impose the conditions received.

It will be appreciated that the techniques disclosed herein may be used to control the various types of flow rate management parameters for wells in an oilfield incorporating associated well flow rate management mechanisms, and using performance curves generated for such particular flow rate management parameters, e.g., lift gas rates for gas-based artificial lift mechanisms, power fluid flow rates, horsepower or wattage for pump-based artificial lift mechanisms, chemical concentrations or supply rates for chemical stimulation, valve settings for flow restriction devices, etc. Moreover, in some embodiments, different wells may incorporate different well flow rate management mechanisms or technologies, and in some wells, multiple well flow rate management mechanisms may be used (e.g., ESP+choke+ chemical stimulation in the same well), and an oilfield-wide allocation solution may be generated in the manner described above to establish values for different types of flow rate management parameters meeting that overall allocation solution. In such instances, flow rate management parameters for all of different flow rate management mechanisms may be simultaneously optimized subject to constraints in the system such as maximum pressure drawdown in each well.

By utilizing a network simulation model as a proxy for the overall field, a convergence may be performed in connection with the generation of an optimal allocation solution to provide stability and optimum allocation, and to manage constraints in advance of applying the optimal allocation solution to the generation of individual well-specific control signals and the implementation of the optimal allocation solution in the field. As such, an optimal allocation solution may be generated and passed to well controllers only after a steady state solution has been estimated. In addition, challenges associated with other approaches, such as where the choice for a slope solution may be unclear, where initial condition requirements may not be specified, or where an optimal solution may not be returned, may be avoided. In addition, curve validation and constraint management may be managed at the central controller, thereby relieving individual well controllers of such responsibility.

Therefore, in some embodiments of the invention, local well representations, or some representation of the entire system, may be utilized as one or more proxy models to represent an oilfield-wide representation. A proxy model in some embodiments may be defined as practically any analytical representation of a computationally demanding numerical simulation, e.g., via curve fitting, surface generation, neural network, radial-basis function, kriging, etc., and may serve to provide a fast, robust and sufficiently accurate model to expedite the optimization process. In addition, in some embodiments, if proxy representations are unavailable for some given resource quantity, then a central controller may resort to the use of a full network simulation. Further, constraints that impact the entire system may be managed using a proxy model of the entire system (or the full field model directly).

Further, given that different wells may have different combinations of one or more flow rate management mechanisms, proxy models may have more than one dimension in some embodiments, whereby rather than a curve, a surface or other suitable analytical representation in multiple dimensions may be used. The procedure in block 708 may therefore be considered to be a multi-variate optimization process that is concerned with the distribution of one or more scarce resources.

Although the preceding description has been described herein with reference to particular means, materials, and embodiments, it is not intended to be limited to the particular disclosed herein. By way of further example, embodiments may be utilized in conjunction with a handheld system (i.e., a phone, wrist or forearm mounted computer, tablet, or other handheld device), portable system (i.e., a laptop or portable computing system), a fixed computing system (i.e., a desktop, server, cluster, or high performance computing system), or across a network (i.e., a cloud-based system). As such, embodiments extend to all functionally equivalent structures, methods, uses, program products, and compositions as are within the scope of the appended claims. In addition, while particular embodiments have been described, it is not intended that the invention be limited thereto, as it is intended that the invention be as broad in scope as the art will allow and that the specification be read likewise. It will therefore be appreciated by those skilled in the art that yet other modifications could be made without deviating from its spirit and scope as claimed.

What is claimed is:

1. A method of performing oilfield-wide production optimization in a field comprising a plurality of wells, with each well including a well flow rate management mechanism controlled by an associated well controller, the method comprising, in a central controller:
   accessing a network simulation model as a proxy of the field to determine an allocation solution for the field;
   generating a well-specific control signal for each of the plurality of wells based upon the determined allocation solution;
   communicating the well-specific control signal for each of the plurality of wells to the associated well controller to cause the associated well controller to control a flow rate management parameter associated with the well flow rate management mechanism for the well based upon the communicated well-specific control signal;
   receiving actual field data collected from the field after the well-specific control signal for each of the plurality of wells has been communicated to the associated well controller and after the field has reached equilibrium, the received actual field data including a well head pressure, a flow rate and/or a temperature;
   determining that a difference between the received actual field data and the network simulation model is greater than a predetermined threshold, wherein the predetermined threshold is a non-zero threshold; and
   in response to determining that the difference is greater than the predetermined threshold, determining the allocation solution using an iterative converging procedure that is based on the actual field data.

2. The method of claim 1, further comprising running an oilfield-wide simulation to generate the network simulation model.

3. The method of claim 2, further comprising generating a well-specific model for each of the plurality of wells.

4. The method of claim 3, further comprising generating a descriptive proxy model representing an oilfield-wide simulation, wherein generating the well-specific control signal for each of the plurality of wells includes generating the well-specific control signal using the descriptive proxy model representing the oilfield-wide simulation.

5. The method of claim 3, further comprising generating a descriptive proxy model for each of the plurality of wells from the well-specific model for each of the plurality of wells, wherein generating the well-specific control signal for each of the plurality of wells includes generating the well-specific control signal using the descriptive proxy model for each of the plurality of wells.

6. The method of claim 5, wherein running the oilfield-wide simulation and generating the descriptive proxy model are performed externally to the central controller, the method further comprising communicating the network simulation model and each descriptive proxy model to the central controller.

7. The method of claim 5, wherein the descriptive proxy model includes a set of performance curves, a set of performance surfaces, or an n-dimensional analytical representation.

8. The method of claim 2, further comprising:
collecting the actual field data; and
retuning at least one well-specific model in response to determining from the collected
actual field data that the allocation solution is out of tolerance.

9. The method of claim 1, wherein the well flow rate management mechanism for at least one well comprises a gas lift mechanism, and wherein the flow rate management parameter for the at least one well comprises a gas lift rate.

10. The method of claim 1, wherein the well flow rate management mechanism for at least one well comprises a pump-based artificial lift mechanism, and wherein the flow rate management parameter for the at least one well comprises an electrical power, a pump rate, or a power fluid flow rate.

11. The method of claim 1, wherein the well flow rate management mechanism for at least one well comprises a flow restriction device, and wherein the flow rate management parameter for the at least one well comprises an allowed flow rate or a position or setting of the flow restriction device.

12. The method of claim 1, wherein the well flow rate management mechanism for at least one well comprises a chemical stimulation mechanism, and wherein the flow rate management parameter for the at least one well comprises a quantity, flow rate, or concentration level of a chemical stimulant.

13. The method of claim 1, wherein at least two wells include different types of well flow rate management mechanisms, and wherein the flow rate management parameters for the at least two wells are of different types.

14. The method of claim 1, wherein at least one well includes multiple types of well flow rate management mechanisms, and wherein determining the allocation solution for the field includes simultaneously determining multiple respective flow rate management parameters for the multiple types of well flow rate management mechanisms for the at least one well.

15. The method of claim 1, further comprising generating well-specific models for the plurality of wells, wherein the well-specific models model a well flow rate relationship for varying well head pressure values, wherein the allocation solution is determined using both the network simulation model and the well-specific models.

16. The method of claim 1, further comprising running the network simulation model and the iterative procedure based on the actual field data in parallel to calibrate the network simulation model.

17. The method of claim 1, further comprising modifying the flow rate management parameter in response to determining the allocation solution using the iterative converging procedure.

18. A central controller for performing oilfield-wide production optimization in a field comprising a plurality of wells, with each well including a well flow rate management mechanism controlled by an associated well controller, the central controller comprising:
at least one processor; and
program code configured upon execution by the at least one processor to:
access a network simulation model as a proxy of the field to determine an allocation solution for the field,
generate a well-specific control signal for each of the plurality of wells based upon the determined allocation solution,
communicate the well-specific control signal for each of the plurality of wells to the associated well controller to cause the associated well controller to control a flow rate management parameter associated with the well flow rate management mechanism for the well based upon the communicated well-specific control signal,
receive actual field data collected from the field after the well-specific control signal for each of the plurality of wells has been communicated to the associated well controller and after the field has reached equilibrium, the received actual field data including a well head pressure, a flow rate and/or a temperature;
determine that a difference between the received actual field data and the network simulation model is greater than a predetermined threshold, wherein the predetermined threshold is a non-zero threshold; and
in response to determining that the difference is greater than the predetermined threshold, determine the allocation solution using an iterative converging procedure that is based on the actual field data.

19. The central controller of claim 18, wherein the network simulation model is generated from a field-wide simulation, wherein the program code is further configured to access a well-specific model for each of the plurality of wells, wherein the program code is further configured to access one or more descriptive proxy models representing an oilfield-wide simulation and/or a well from the plurality of wells, and wherein the program code is configured to generate the well-specific control signal for each of the plurality of wells using the one or more descriptive proxy models.

20. The central controller of claim 18, wherein the well flow rate management mechanism for at least one well comprises a gas lift mechanism, a pump-based artificial lift mechanism, a flow restriction device, or a chemical stimulation mechanism, and wherein the flow rate management parameter for at least one well comprises a gas lift rate, an electrical power, a pump rate, a power fluid flow rate, a position or setting of a flow restriction device, or a quantity, flow rate, or concentration level of a chemical stimulant.

21. The central controller of claim 18, wherein at least two wells include different types of well flow rate management mechanisms, and wherein the flow rate management parameters for the at least two wells are of different types.

22. A non-transitory computer readable storage medium having a set of computer-readable instructions residing thereon that, when executed, perform oilfield-wide optimization in a field comprising a plurality of wells, with each well including a well flow rate management mechanism controlled by an associated well controller, wherein the set of computer-readable instructions are configured upon execution by a central controller to:

access a network simulation model as a proxy of the field to determine an allocation solution for the field, generate a well-specific control signal for each of the plurality of wells based upon the determined allocation solution, communicate the well-specific control signal for each of the plurality of wells to the associated well controller to cause the associated well controller to control a flow rate management parameter associated with the well flow rate management mechanism for the well based upon the communicated well-specific control signal, receive actual field data collected from the field after the well-specific control signal for each of the plurality of wells has been communicated to the associated well controller and after the field has reached equilibrium, the received actual field data including a well head pressure, a flow rate and/or a temperature, determine that a difference between the received actual field data and the network simulation model is greater than a predetermined threshold, wherein the predetermined threshold is a non-zero threshold; and in response to determining that the difference is greater than the predetermined threshold, determine the allocation solution using an iterative converging procedure that is based on the actual field data.

* * * * *